(12) United States Patent
Nurmi

(10) Patent No.: US 10,585,503 B2
(45) Date of Patent: Mar. 10, 2020

(54) APPARATUS COMPRISING USER INTERFACE DEVICE

(71) Applicant: Nokia Technologies Oy, Espoo (FI)

(72) Inventor: Juha Harri-Pekka Nurmi, Salo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/781,673

(22) PCT Filed: Apr. 5, 2013

(86) PCT No.: PCT/IB2013/052737
§ 371 (c)(1),
(2) Date: Oct. 1, 2015

(87) PCT Pub. No.: WO2014/162173
PCT Pub. Date: Oct. 9, 2014

(65) Prior Publication Data
US 2016/0054824 A1 Feb. 25, 2016

(51) Int. Cl.
*G06F 3/041* (2006.01)
*G06F 1/16* (2006.01)

(52) U.S. Cl.
CPC ............ *G06F 3/041* (2013.01); *G06F 1/1616* (2013.01); *G06F 1/1641* (2013.01); *G06F 1/1643* (2013.01); *G06F 1/1652* (2013.01); *G06F 3/0412* (2013.01); *G06F 2203/04102* (2013.01)

(58) Field of Classification Search
CPC .... G06F 1/1652; G06F 1/1643; G06F 1/1641; G06F 1/1616; G06F 3/041; G06F 3/0412; G06F 2203/04102; G02F 1/133305; G02F 1/1345; H05K 1/148; H01J 9/00
See application file for complete search history.

(56) References Cited

U.S. PATENT DOCUMENTS

| 8,502,788 | B2 * | 8/2013 | Cho | G06F 1/1626 345/173 |
|---|---|---|---|---|
| 2007/0262916 | A1 * | 11/2007 | Kee | G02F 1/13336 345/1.3 |
| 2009/0322689 | A1 * | 12/2009 | Kwong | G06F 3/04883 345/173 |
| 2010/0187979 | A1 * | 7/2010 | Shim | G02F 1/133305 313/504 |
| 2011/0210937 | A1 * | 9/2011 | Kee | G06F 3/041 345/174 |
| 2012/0038570 | A1 | 2/2012 | Delaporte | 345/173 |
| 2012/0147599 | A1 | 6/2012 | Shim et al. | 362/231 |
| 2012/0236509 | A1 * | 9/2012 | Cope | G02F 1/133305 361/730 |
| 2013/0086513 | A1 * | 4/2013 | Rasmussen | G06F 1/1643 715/792 |

FOREIGN PATENT DOCUMENTS

EP 1855149 A1 11/2007

* cited by examiner

*Primary Examiner* — David D Davis
(74) *Attorney, Agent, or Firm* — Harrington & Smith

(57) ABSTRACT

An apparatus including a plurality of layers configured to provide a user interface device; and a flexible layer overlaying the plurality of layers; wherein the flexible layer is continuous across a bend region and at least one of the plurality of layers is discontinuous across the bend region.

16 Claims, 9 Drawing Sheets

Figure 1:
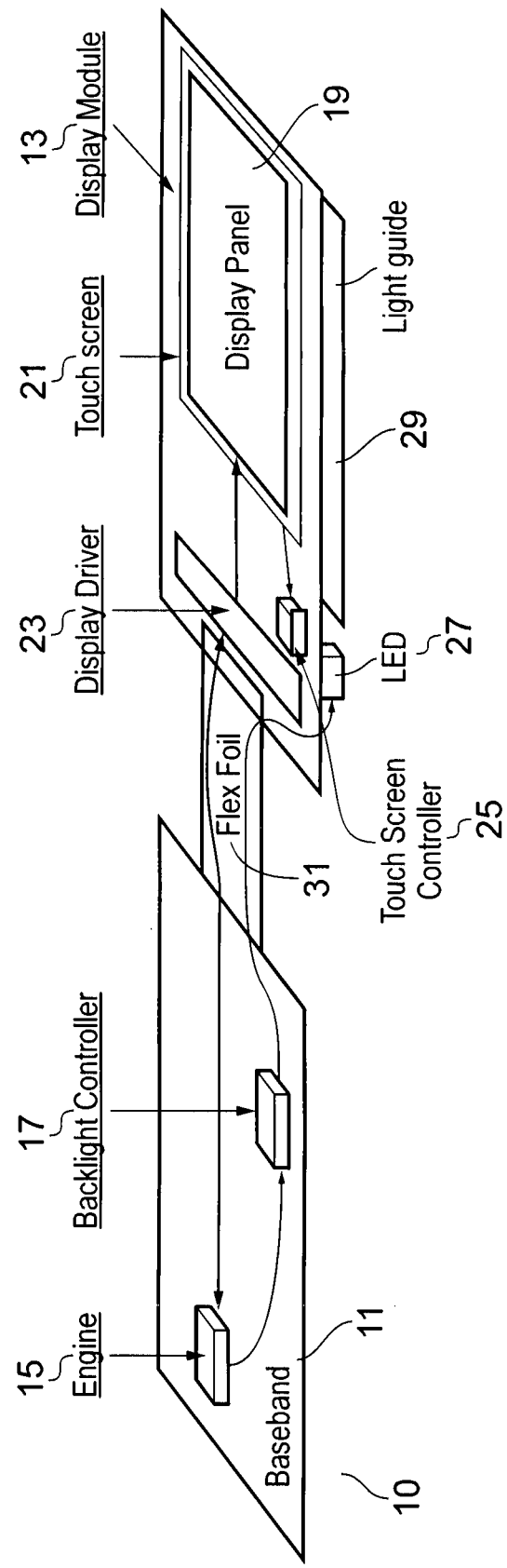

----- ANODE
——— CATHODE
—•—•— GATE

APPARATUS COMPRISING USER INTERFACE DEVICE

TECHNOLOGICAL FIELD

Embodiments of the present invention relate to an apparatus comprising a user interface device. In particular, they relate to a flexible or hinged apparatus comprising a user interface device.

BACKGROUND

Electronic devices comprising user interface devices are known. A user interface device may comprise, for example, a display portion and/or a user actuable portion. The display portion may comprise means which enables information to be displayed. The user actuable portion may comprise a portion which enables a user to control an electronic device and/or input information into the electronic device. The user actuable portion may comprise, for example, a touch screen or touch pad or any other suitable actuable portion.

Some electronic devices may be flexible or hinged. It may be useful to provide flexible or hinged user interface devices which can be used in the flexible or hinged electronic devices.

BRIEF SUMMARY

According to various, but not necessarily all examples of the disclosure there may be provided an apparatus comprising: a plurality of layers configured to provide a user interface device; and a flexible layer overlaying the plurality of layers; wherein the flexible layer is continuous across a bend region and at least one of the plurality of layers is discontinuous across the bend region.

The user interface device may comprise a display.

The user interface device may comprise a touch sensitive portion.

The plurality of layers may be configured so that the user interface device is operable across the bend region.

The plurality of layers may comprise a first subset of layers configured to provide a display and a second subset of layers configured to provide a touch sensitive portion.

The plurality of layers may be configured so that a plurality of discontinuities are provided in the plurality of layers in the bend region.

The plurality of layers may be arranged so as to provide a plurality of pixels in the bend region where the plurality of pixels are provided in an arrangement which enables bending of the bend region. The plurality of layers may be arranged so as to provide a plurality of separate individual pixels in the bend region. The plurality of layers may be arranged so as to provide a plurality of separate rows of pixels in the bend region. The cross-sectional shape of the pixels may be configured to facilitate bending of the bend region.

The bend region may comprise a hinge.

The bend region may comprise a living hinge.

According to various, but not necessarily all examples of the disclosure there may be provided an electronic device comprising an apparatus as described above. The electronic device may comprise a flexible portion.

The apparatus may be for enabling a user to interact with an electronic device. The electronic device may be, for example, a communications device such as a wireless communications device.

BRIEF DESCRIPTION

Figure 2:
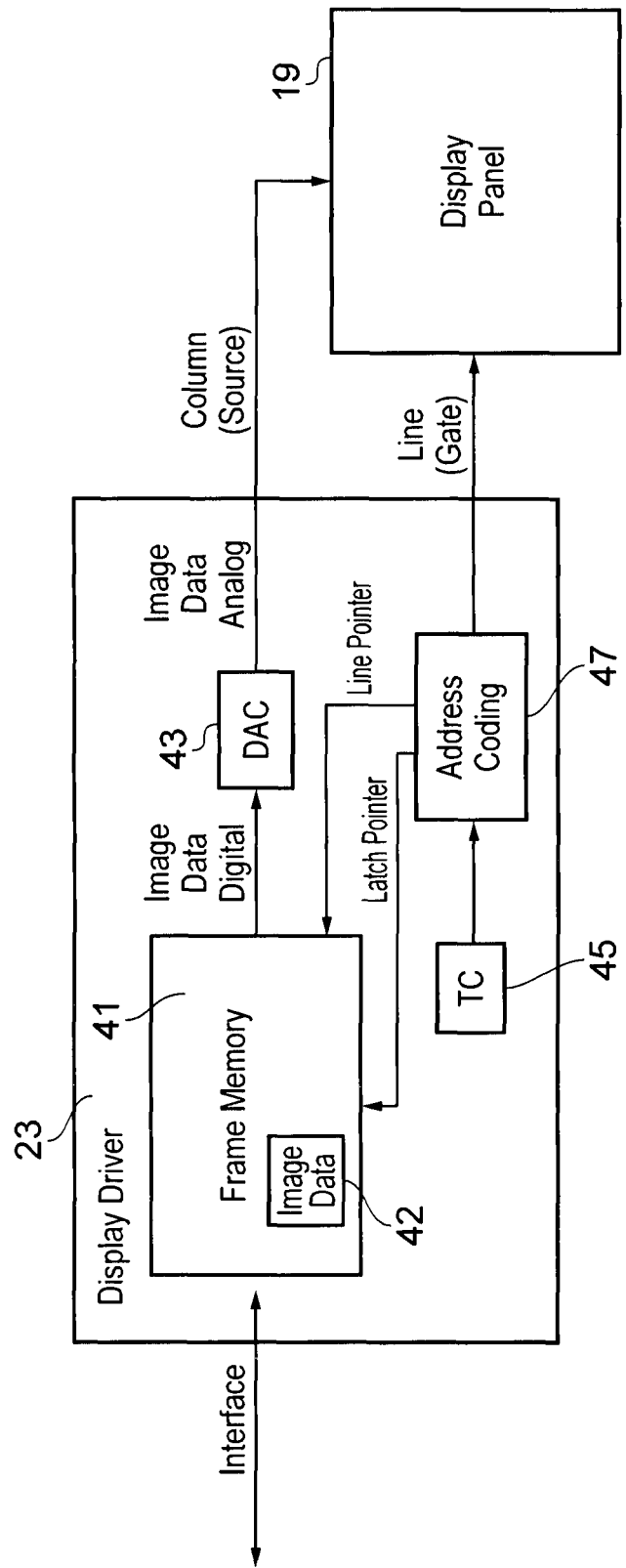
Figure 3A:
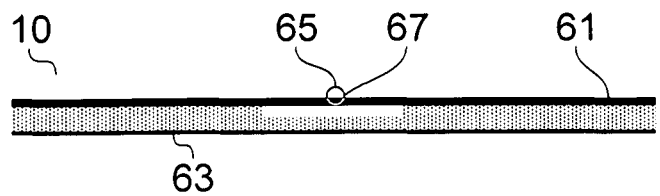
Figure 3B:
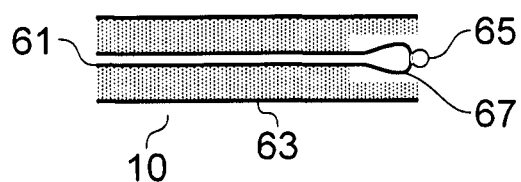
Figure 4:
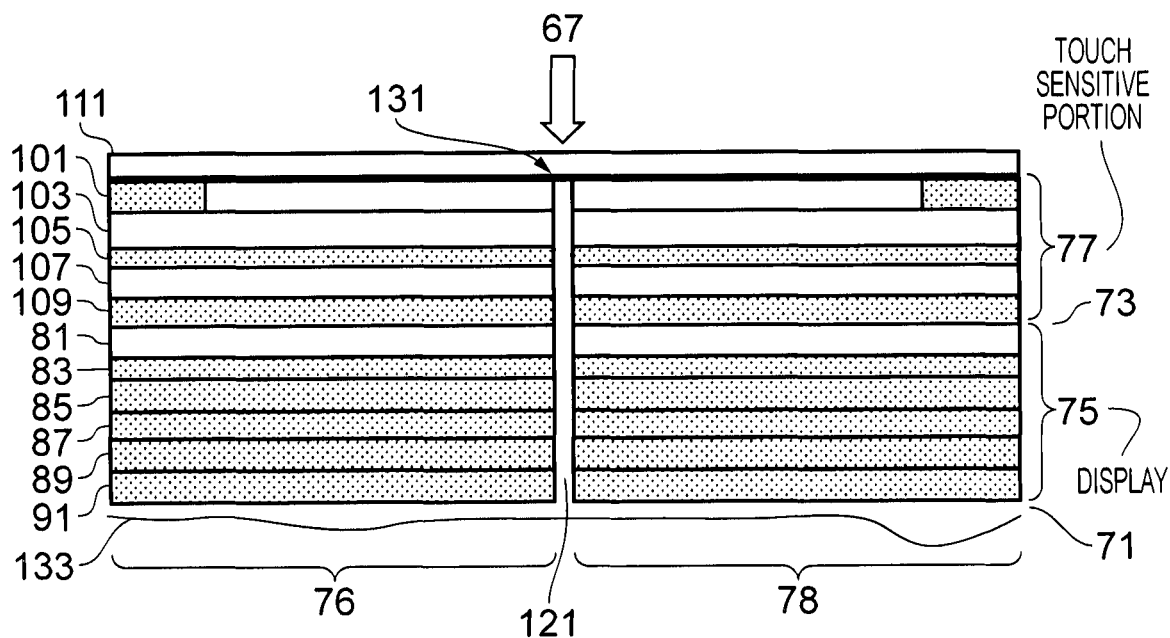
Figure 5A:
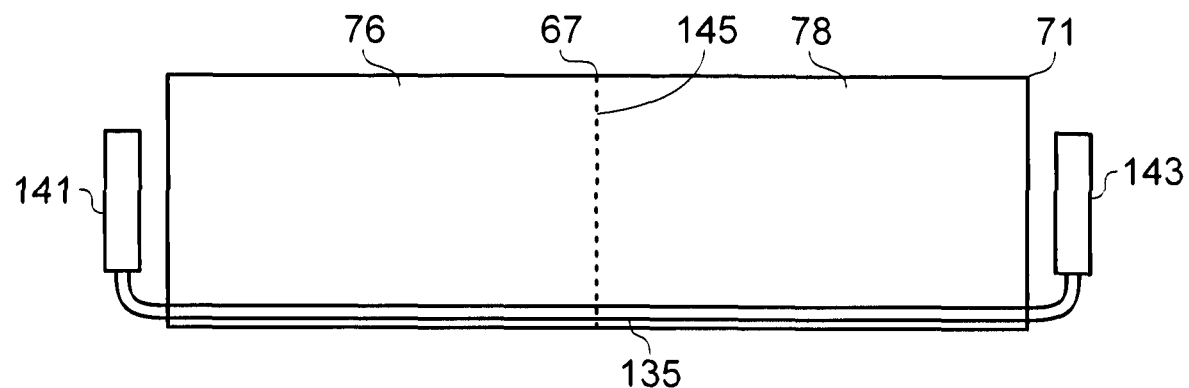
Figure 5B:
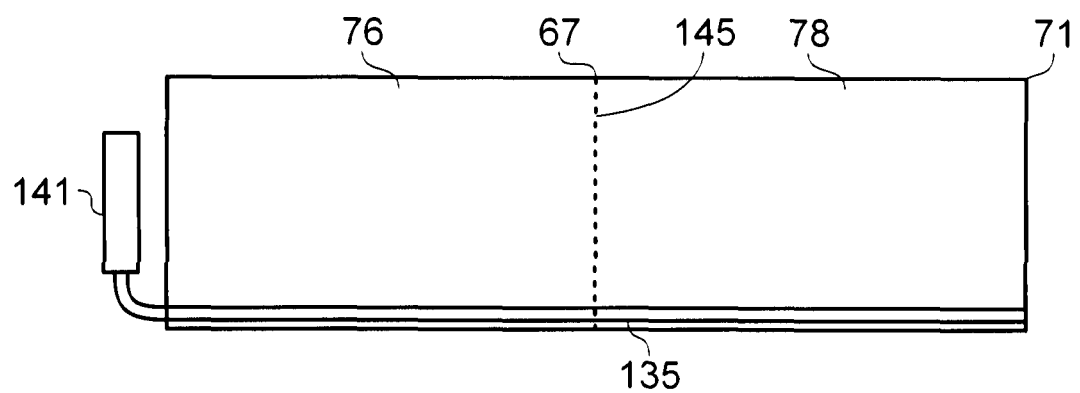
Figure 6A:
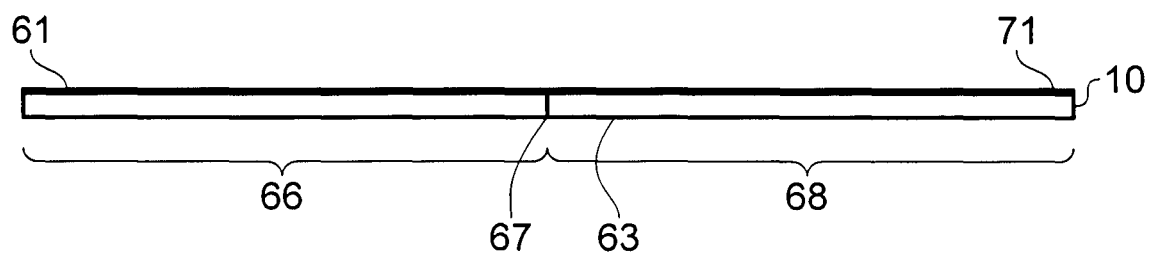
Figure 6B:
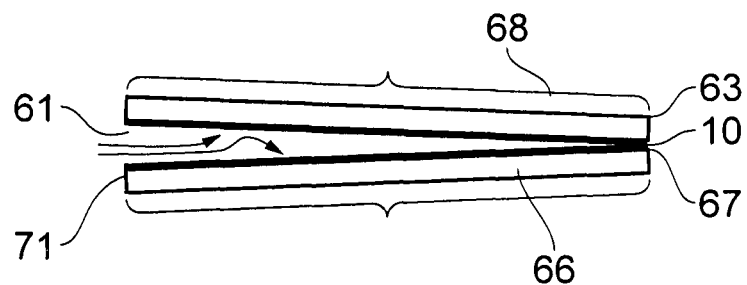
Figure 7:
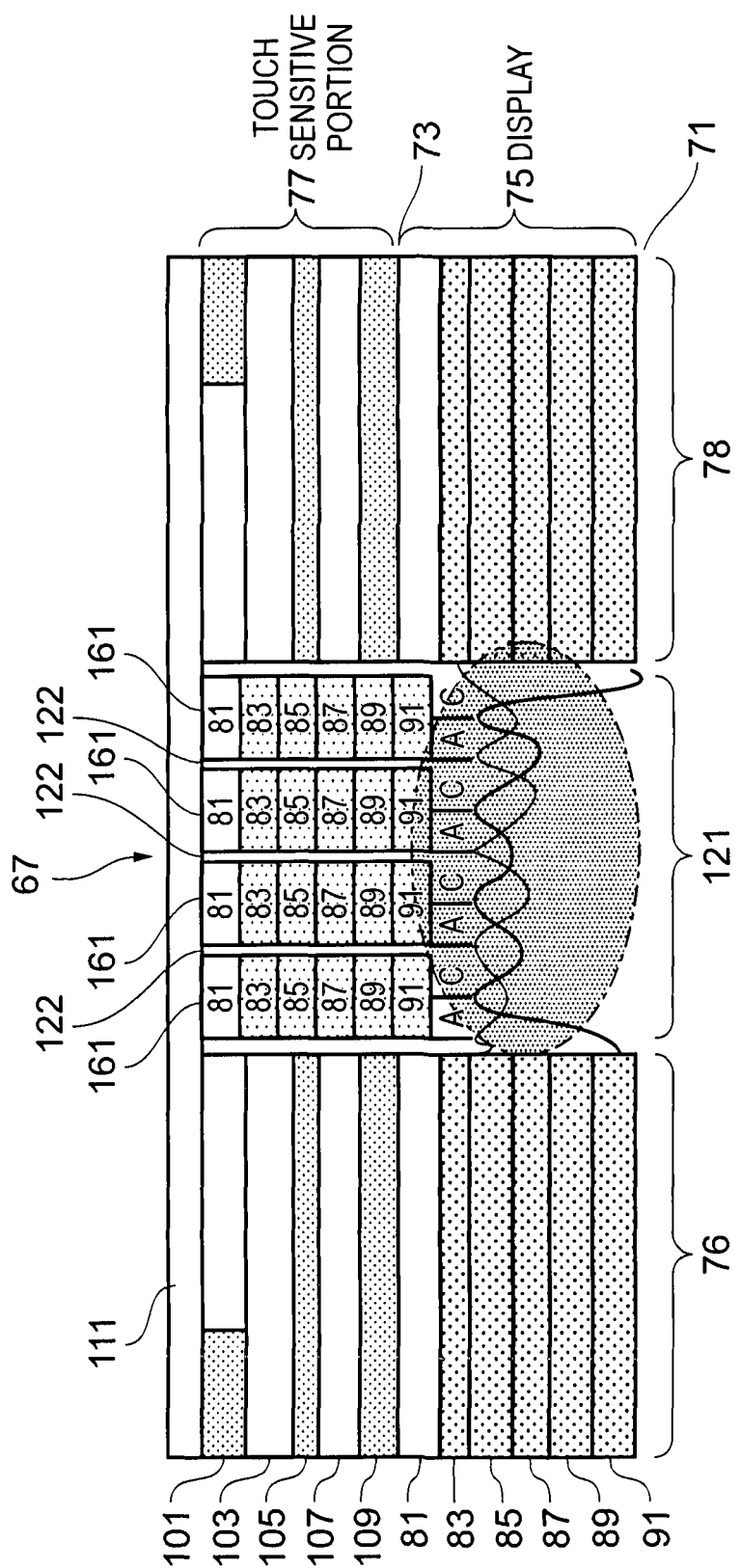
Figure 9A:
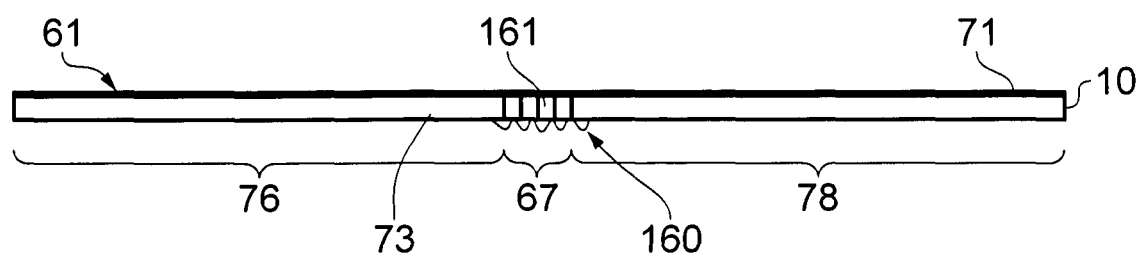
Figure 9B:
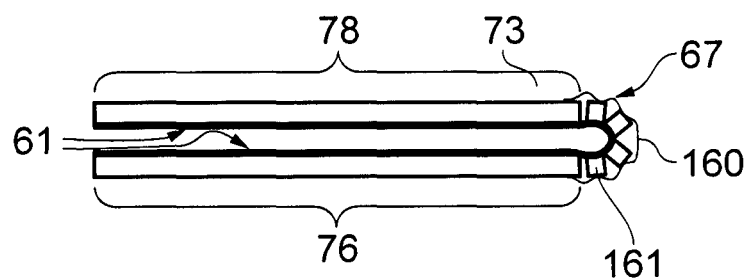
Figure 10A:
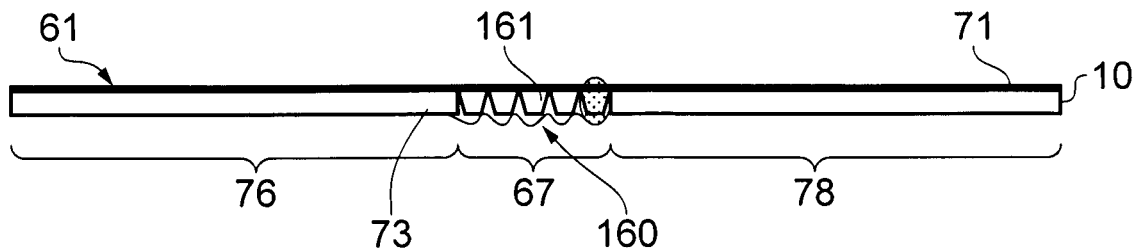
Figure 10B:
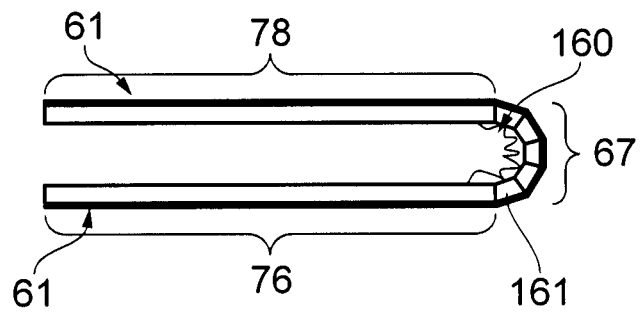
Figure 10C:
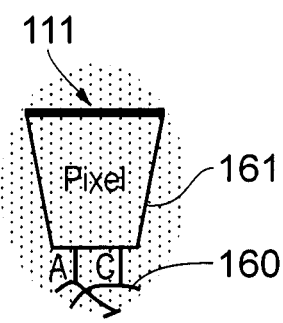

For a better understanding of various examples that are useful for understanding the detailed description, reference will now be made by way of example only to the accompanying drawings in which:

FIG. 1 represents an electronic device;
FIG. 2 represents a display driver of an electronic device;
FIGS. 3A and 3B represent an electronic device;
FIG. 4 represents an apparatus;
FIGS. 5A and 5B represent an apparatus;
FIGS. 6A and 6B represent an electronic device;
FIG. 7 represents an apparatus;
FIGS. 8A to 8D represent an apparatus;
FIGS. 9A to 9B represent an electronic device; and
FIGS. 10A to 10C represent an electronic device.

DETAILED DESCRIPTION

The Figures illustrate an apparatus 71 comprising: a plurality of layers 73 configured to provide a user interface device 61; and a flexible layer 111 overlaying the plurality of layers 73; wherein the flexible layer 111 is continuous across a bend region 67 and at least one of the plurality of layers 73 is discontinuous across the bend region 67.

FIG. 1 illustrates an example electronic device 10 according to examples of the disclosure. The electronic device 10 may be, for example, a mobile cellular telephone, a personal computer, a gaming device, a personal digital assistant, a personal music player, a tablet computer or any other electronic device 10 which may comprise a user interface device. The electronic device 10 may be a handheld electronic device 10 which can be carried in a user's hand, handbag or pocket of their clothing for example.

The example electronic device 10 comprises a baseband 11 and a display module 13. Only features which assist the understanding of the following description are illustrated in FIG. 1. However, it is to be appreciated that the electronic device 10 and the respective components may comprise additional features that are not illustrated in FIG. 1. For example, where the electronic device 10 is a communications device a communications module may be provided.

The baseband 11 comprises components which control the electronic device 10. In the illustrated example the baseband 11 comprises an engine controller 15 and a back light controller 17. The engine controller 15 may be configured to control the general functions of the electronic device 10. The backlight controller 17 may be configured to control the back light of the display module 13. The engine controller 15 may be configured to provide a control signal to the backlight controller 17. The engine controller 15 may be configured to control the backlight controller 17.

The controllers 15, 17 may comprise at least one processor and at least one memory. In other examples, other electronic and/or control components which may control the functions of the electronic device 10 may also be provided on the baseband 11.

In the example of FIG. 1 a flex foil 31 connects the base band 11 to the display module 13. The flex foil 31 may comprise a multipoint connection which may enable control signals to be exchanged between the baseband 11 and the display module 13.

The display module 13 may provide a user interface device. The user interface device may enable a user to interact with the electronic device 10. In the example of FIG. 1 the user interface device comprises a display and a touch screen 21.

The display comprises a display panel 19 and a display driver 23. The display panel 19 may comprise a plurality of pixels which may be configured to display data. The display panel 19 may comprise, for example, a liquid crystal display. Other types of display may be used in other examples of the disclosure.

The display driver 23 may be configured to control the display panel 19. For example the display driver 23 may control the information which is displayed on the display panel 19 and the timings of the pixels of the display panel 19.

The engine controller 15 may be configured to provide a control signal to the display driver 23 to control the information which is displayed by the display panel 19. The control signal may be provided via the multipoint connection.

In the example of FIG. 1 the display module 13 also comprises a touch screen 21. The touch screen 21 may comprise a user actuable portion which may be configured to enable a user to input information to the electronic device 10 or control the electronic device 10. The touch screen 21 may be configured to be actuated by a user touching the touch screen 21 with an object such as their finger or a stylus. In some examples the touch screen 21 may be configured to enable a user to actuate the touch screen 21 by bringing an object such as their finger or stylus close to the surface of the touch screen 21.

The display module 13 may also comprise a touch screen controller 25 which may be configured to control the touch screen 21. The engine controller 15 may be configured to provide a control signal to the touch screen controller 25 to control the touch screen controller 25. The control signal may be provided via the multipoint connection.

The touch screen controller 25 may be configured to detect when the touch screen 21 has been actuated and provide an indication of the actuation to the engine controller 15. The touch screen controller 25 may comprise one or more buffers or other memories.

The touch screen 21 may comprise a resistive, optical or capacitive touch screen 21 or any other suitable type of touch screen 21.

The display module 13 may also comprise a light source 27. In the example of FIG. 1 the light source 27 comprises a light emitting diode (LED). Other light sources 27 may be used in other examples. The light source 27 may be configured to provide a back light to the display panel 19.

The light source 27 may be configured to be controlled by the back light controller 17 on the baseband 11. The control signal may be provided from the back light controller 17 to the light source 27 via the multipoint connection.

In the example of FIG. 1 a light guide 29 is provided between the light source 27 and display panel 19. The light guide 29 may be configured to direct the light emitted by the light source 27 towards the display panel 19.

An example of a display driver 23 is illustrated in more detail in FIG. 2. The example display driver 23 comprises a frame memory 41, a digital to analogue converter (DAC) 43, a timing controller (TC) 45 and an address coding block 47.

The frame memory 41 may be configured to store image data 42. The image data 42 may be received from the engine controller 15 via the flex foil 31 interface. The image data 42 may be stored in the frame memory 41 as digital values, for example, digital grey scale values.

The frame memory 41 may be configured to provide the digital image data 42 to the DAC 43. The DAC 43 may be configured to convert the digital image data 42 to an analogue signal and provide the analogue signal to the source lines of the display panel 19.

The timing controller 45 may be configured to send timing information to the address coding block 47. The address coding block 47 may be configured to provide control signals to the frame memory 41 and display panel 19. The control signal provided by the address coding block 47 to the frame memory 41 controls which location is read from in the frame memory 41 and inputted to the display panel 19 via the DAC 43. The control signal provided by the address coding block 47 to the display panel 19 controls the location of the image data 42 on the display panel 19.

FIGS. 3A and 3B illustrate an example electronic device 10 which may comprise a hinged and/or flexible portion. The electronic device 10 may be configured for communication. The electronic device 10 may be configured for wireless communication.

The electronic device 10 may comprise a user interface device 61. The user interface device 61 may comprise a display and/or a touch sensitive portion. The user interface device 61 may comprise a display module 13 as described above with reference to FIGS. 1 and 2.

The electronic device 10 comprises a casing 63. The casing 63 may provide an outer surface of the electronic device 10. The electronic components illustrated in FIGS. 1 and 2 may be contained within the casing 63. The casing 63 may provide a protective housing for the electronic components. The user interface device 61 may form part of the casing 63. This may enable a user to actuate the user interface device 61.

The electronic device 10 comprises a bend region 67. The bend region 67 may comprise a hinge 65. The bend region 67 may comprise a living hinge. The living hinge may comprise a hinge 65 made out of the same material as the portions connected by the hinge 65. In some examples the portions of the electronic device 10 connected by the hinge 65 may be rigid or substantially rigid. In other examples the portions of the electronic device 10 connected by the hinge 65 may be flexible.

The user interface device 61 may extend across the bend region 67 so that a first portion of the user interface device 61 is provided on one side of the bend region 67 and a second portion of the user interface device 61 may be provided on the other side of the bend region 67.

The bend region 67 may enable the electronic device 10 to be moved between an open configuration and a closed configuration. An example open configuration is illustrated in FIG. 3A and an example closed configuration is illustrated in FIG. 3B. In the example open configuration the electronic device 10 is opened flat or substantially flat. In the example open configuration the user interface device 61 may be accessible to a user. In the example closed configuration the electronic device 10 is folded so that the user interface device 61 is not accessible to the user.

FIG. 4 illustrates an apparatus 71 according to examples of the disclosure. FIG. 4 illustrates a cross section through an apparatus 71. The apparatus 71 comprises a plurality of layers 73 configured to form a user interface device 61. In the example of FIG. 4 the user interface device 61 comprises a touch sensitive display. It is to be appreciated that in other examples the user interface device 61 may comprise a display or a touch sensitive portion. In the example of FIG. 4 the plurality of layers 73 comprises a first subset of layers 75 which may be configured to provide a display. In the example of FIG. 4 the plurality of layers 73 also comprises a second subset of layers 77 which may be configured to provide a touch sensitive portion. The plurality of layers 73 may be coupled together.

In the example of FIG. 4 the plurality of layers 73 are arranged in a laminar structure. The plurality of layers 73 are stacked overlaying each other.

In the example of FIG. 4 the first subset of layers 75 provides an organic light-emitting diode (OLED) display. It is to be appreciated that other types of display may be provided in other examples of the disclosure.

In the example of FIG. 4 the first subset of layers 75 comprises a top substrate 81, an anode layer 83, a hole injection layer 85, an organic emitter layer 87, an electron transport layer 89 and a cathode layer 91.

The top substrate 81 may comprise a transparent material. For example, the top substrate 81 may comprise a clear plastic or polymer layer. The anode layer 83 may also comprise a transparent material.

The hole injection layer 85, the emitter layer 87 and the electron transport layer 89 may comprise any suitable materials which may be arranged so that light is emitted when a voltage is applied between the anode layer 81 and the cathode layer 91. The hole injection layer 85, the emitter layer 87 and the electron transport layer 89 may comprise any suitable organic materials such as organic polymers.

In the example of FIG. 4 the cathode layer 91 is provided at the bottom of the first subset of layers 75. The cathode layer 91 may comprise any suitable material. In some examples the cathode layer 91 may comprise metal.

In the example of FIG. 4 the second subset of layers 77 provides a touch sensitive portion. The second subset of layers 77 comprises a top guard layer 101, a first insulator layer 103, a touch pattern layer 105, a second insulator layer 107 and a bottom guard layer 109.

The bottom guard layer 109 may be configured to eliminate noise from the layers provided underneath the bottom guard layer 109. This may prevent the touch pattern layer 105 from detecting noise from the display. The bottom guard layer 109 may comprise any suitable material.

The touch pattern layer 105 may be configured to detect an object which is touching or is close to the user interface device 61. A first insulator layer 103 and a second insulator layer 107 are provided on either side of the touch pattern layer 105.

The top guard layer 101 is provided overlaying the touch pattern layer 105 and the insulator layers 103, 107. The top guard layer 101 may be configured to protect the touch pattern layer 105.

In the example of FIG. 4 the second subset of layers 77 are provided overlaying the first subset of layers 75. The second subset of layers 77 may be transparent so that the display layers are visible through the touch sensitive layers.

In the example of FIG. 4 a substrate 111 is provided overlaying the plurality of layers 73. The substrate 111 may comprise a flexible layer. The substrate 111 may provide a protective surface for the apparatus 71. The substrate 111 may be configured to protect the plurality of layers 73. In some examples the substrate 111 may be configured to protect the electronic components within the plurality of layers 73 from an external environment.

In some examples the substrate 111 may provide part of the outer surface of a casing 63 of an electronic device 10. In some examples the substrate 111 may be configured to that a user can actuate the touch sensitive portion by touching the substrate 111 or bringing an object close to the surface of the substrate 111.

In some examples the substrate 111 may be flexible. The substrate 111 may be flexible to enable a user to bend the substrate 111 between an open and closed position as illustrated in FIGS. 3A and 3B. The substrate 111 may be coupled to the other layers of the apparatus 71 to provide a protective over-layer.

The apparatus 71 comprises a bend region 67. The bend region 67 comprises the region which bends when the apparatus 71 is moved between open and closed positions. The bend region 67 may comprise a hinge 65 such as a living hinge.

In the example of FIG. 4 the bend region 67 is provided in the centre of the apparatus 71. It is to be appreciated that in other examples the bend region 67 may be provided in other locations.

In the example of FIG. 4 the plurality of layers 73 are discontinuous in the bend region 67 of the apparatus 71. The plurality of layers 73 may be discontinuous so that a gap 121 is provided between a first portion 76 of a layer and a second portion 78 of the layer. In the example of FIG. 4 the plurality of layers 73 are discontinuous so that the gap 121 is aligned for each of the plurality of layers 73.

The plurality of layers 73 may be arranged so that the gap 121 between the two portions 76, 78 of the plurality of layers 73 is small. The touch sensitive portion may be arranged so that the touch pattern layer 105 may detect when a user actuates the bend region 67. The display portion may be configured so that the gaps 121 in the display layers might not be perceptible by a user viewing the electronic device 10.

In the example of FIG. 4 all of the plurality of layers 73 are discontinuous in the bend region 67. It is to be appreciated that in other examples one or more of the plurality of layers 73 may be continuous across the bend region 67. For example, in some apparatus 71 the bottom guard layer 109 may be continuous.

The flexible substrate 111 is continuous in the bend region 67. The flexible substrate 111 provides a continuous surface over the bend region 67. This may ensure that the electronic components of the apparatus 71 are protected from the environment across the bend region 67.

As the plurality of layers 73 are discontinuous electrical connections may be provided across the gap 121. The electrical connections may comprise any suitable means for connecting the respective portions 76, 78 of the plurality of layers 73. In some examples the electrical connections may comprise laminated wires 131. The laminated wires 131 may be provided on the flexible substrate 111 as illustrated in FIG. 4. In some examples the electrical connections may comprise a plurality of separate wires 133. The separate wires 133 may be provided in place of or in addition to the laminated wires 131.

FIGS. 5A and 5B schematically illustrate a plan view of example apparatus 71. The apparatus 71 may be as illustrated in FIG. 4. The dashed line 145 indicates the discontinuity in the bend region 67. It is to be appreciated that in some examples the discontinuity may provide a gap between the first portion 76 of the apparatus 71 and the second portion 78 of the apparatus 71.

In the example of FIG. 5A the apparatus 71 comprises a first controller 141 and a second controller 143. The first controller 141 and the second controller 143 may be configured to control the touch sensitive portion and the display. The first controller 141 is provided on one side of the discontinuity in the plurality of the layers 73 and the second controller 143 is provided on the opposite side of the discontinuity. In some examples the first controller 141 may primarily control the first portion 76 of the apparatus 71 and the second controller 143 may primarily control the second portion 78 of the apparatus 71. The two controllers 141, 143 may be synchronised with each other to enable coordination between the two portions 76, 78 of the apparatus 71. Electrical connections 135 may be provided across the discontinuity to enable the controllers 141, 143 to be synchronised.

In the example of FIG. 5B only one controller 141 is provided. The controller 141 is provided on one side of the discontinuity. The controller 141 may be configured to both the first and second portions 76, 78 of the apparatus 71. A plurality of electrical connections 135 may be provided across the discontinuity to enable the controller 141 to control the portions 76, 78 on the other side of the discontinuity.

In some examples the controllers 141, 143 may be provided on one of the substrate layers of the apparatus 71. In other examples the controllers 141, 143 may be provided at a different location within an electronic device 10.

FIGS. 6A and 6B illustrate an example electronic device 10 which may comprise an apparatus 71 as described above with reference to FIGS. 4 and 5A and 5B. The electronic device 10 may be configured for communication such as wireless communication.

The apparatus 71 may provide a user interface device 61 such as touch sensitive display for a foldable electronic device 10. The apparatus 71 may be provided within a casing 63. The casing 63 may be foldable and/or flexible. The casing 63 may provide a protective housing for the electronic components of the apparatus 71. The casing 63 may comprise a first portion 66 and a second portion 68. The first and second portions 66, 68 of the casing 63 may be connected by a hinge 65 which may enable the first and second portions 66, 68 to be moved between open and closed configurations. The first portion 76 of the apparatus 71 may be provided within the first portion 66 of the casing 63 and the second portion 78 of the apparatus 71 may be provided within the second portion 68 of the casing 63.

In FIG. 6A the electronic device 10 is configured in an open configuration. In the example open configuration the electronic device 10 is opened flat or substantially flat. In the example open configuration the user interface device 61 may be accessible to a user. The apparatus 71 may be configured to enable information to be displayed in the bend region. The apparatus 71 may also be configured to detect user inputs made within the bend region 67.

In FIG. 6B the electronic device 10 is being moved towards a closed configuration. In the closed configuration the first portion 76 of the apparatus 71 and the second portion 78 of the apparatus 71 are provided overlaying and facing each other so that they are not accessible to the user when the electronic device 10 is in the closed configuration.

As the plurality of layers 73 of the apparatus 71 are discontinuous in the bend region 67 this reduces the radius of curvature of the apparatus 71 when it is moved into the closed configuration. This may enable the electronic device 10 to be folded more compactly. It may also make the electronic device 10 easier for a user to move between the open and closed configurations.

Also as the plurality of layers 73 of the apparatus 71 are discontinuous in the bend region 67 this may reduce any bending or deforming of the plurality of layers 73 when the electronic device 10 is moved between open and closed configurations. This may increase the durability of the apparatus 71 as the plurality of layers 73 are subjected to less stress and are less likely to suffer from failure due to fatigue.

FIG. 7 illustrates an apparatus 71 according to another example of the disclosure.

FIG. 7 illustrates a cross section through another example apparatus 71. The apparatus 71 comprises a plurality of layers 73 configured to form a user interface device 61. In the example of FIG. 7 the user interface device 61 comprises a touch sensitive display. It is to be appreciated that in other examples the user interface device 61 may comprise a display or a touch sensitive portion.

The apparatus 71 in the example of FIG. 7 is similar to the example apparatus 71 of FIG. 4 in that the plurality of layers 73 comprises a first subset of layers 75 which may be configured to provide a display and a second subset of layers 77 which may be configured to provide a touch sensitive portion. As with the previous examples the plurality of layers 73 are arranged in a laminar structure with the plurality of layers 73 stacked overlaying each other.

In the example of FIG. 7 the first subset of layers 75 comprises a top substrate 81, an anode layer 83, a hole injection layer 85, an organic emitter layer 87, an electron transport layer 89 and a cathode layer 91 which may be as described above in relation to FIG. 4.

In the example of FIG. 7 the second subset of layers 77 may comprise a top guard layer 101, a first insulator layer 103, a touch pattern layer 105, a second insulator layer 107 and a bottom guard layer 109 which may be configured as described above in relation to FIG. 4.

The example apparatus 71 of FIG. 7 also comprises a substrate 111 overlaying the plurality of layers 73. The substrate 111 may be as described above in relation to FIG. 4.

The apparatus 71 of FIG. 7 also comprises a bend region 67. The bend region 67 comprises the region which bends when the apparatus 71 is moved between open and closed positions. The bend region 67 may comprise a hinge 65 such as a living hinge.

In the example of FIG. 7 the plurality of layers 73 are discontinuous in the bend region 67 of the apparatus 71. The plurality of layers 73 may be discontinuous so that a gap 121 is provided between a first portion 76 of the plurality of layers 73 and a second portion 78 of the plurality of layers 73.

In the example of FIG. 7 a plurality of pixels is provided in the gap 121 between the first portion 76 of the plurality of layers 73 and the second portion 78 of the plurality of layers 73. The plurality of pixels in the bend region 67 may be provided in an arrangement which enables bending of the bend region 67. For example the pixels may be arranged as a plurality of individual pixels 161. This may allow each of the pixels in the bend region 67 to be moved relative to other pixels in the bend region 67 and it may allow for bending of the apparatus 71. In other examples the pixels may be arranged as a plurality of rows. The rows may be parallel. The rows may be arranged to compliment the direction of bending so that a user can still easily bend the apparatus 71. It is to be appreciated that other arrangements of pixels may be used in other examples.

In the example of FIG. 7 a plurality of individual pixels 161 is provided in the gap 121 between the first portion 76 of the plurality of layers 73 and the second portion 78 of the plurality of layers 73. Each of the individual pixels 161 may be separate from the other individual pixels 161. A gap 122 may be provided between each of the individual pixels 161. The gaps between the individual pixels 161 may provide a plurality of discontinuities within the bend region 67. Each individual pixel 161 may comprise a portion of the display.

Each individual pixel 161 may be configured to be individually addressed and referenced by the controller 141, 143 or display driver 23.

Each of the individual pixels 161 comprises a plurality of layers corresponding to the layers in the first subset 75 that make up the display portion. In particular each of the individual pixels 161 comprises a top substrate 81, an anode 83, a hole injection layer 85, an organic emitter 87, an electron transport layer 89 and a cathode 91. An electrical connection may be provided to each of the plurality of anodes 83 and each of the plurality of cathodes 91.

The plurality of individual pixels 161 may be provided directly underneath the flexible layer 111. The second subset of layers 77 might not be provided between the flexible layer 111 and the individual pixels 161. The arrangement of the individual pixels 161 might be such that the respective layers of the individual pixels are provided on a different horizontal level to the respective layers of the first portion 76 of the apparatus 71 and the second portion 78 of the apparatus 71. In some examples the individual pixels 161 may be coupled to the flexible layer 111. In other examples the individual pixels 161 may be provided spaced from the flexible layer 111.

In the particular example of FIG. 7 a plurality of individual pixels 161 are provided. As mentioned above in some examples a plurality of separate groups of pixels may be provided. The groups of pixels may be provided in rows or any other suitable arrangement which allows for bending of the bend region 67.

The first portion 76 of the apparatus 71 and the second portion 78 of the apparatus 71 may provide a horizontal matrix. That is the plurality of layers 73 which are configured to form the first portion 76 and the second portion 78 may extend further in a horizontal direction than a vertical direction. The individual pixels 161 or groups of pixels provided in the gap 121 may provide a vertical matrix. That is, the plurality of layers 73 which are configured to form the individual pixels 161 may extend further in the vertical direction than a horizontal direction.

Figure 8A:
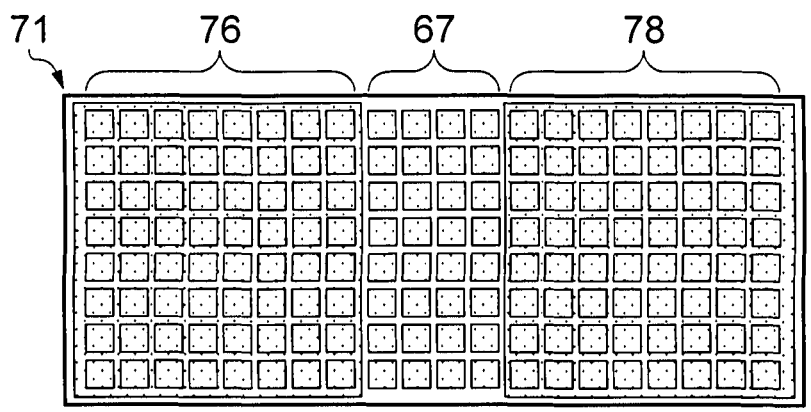
Figure 8B:
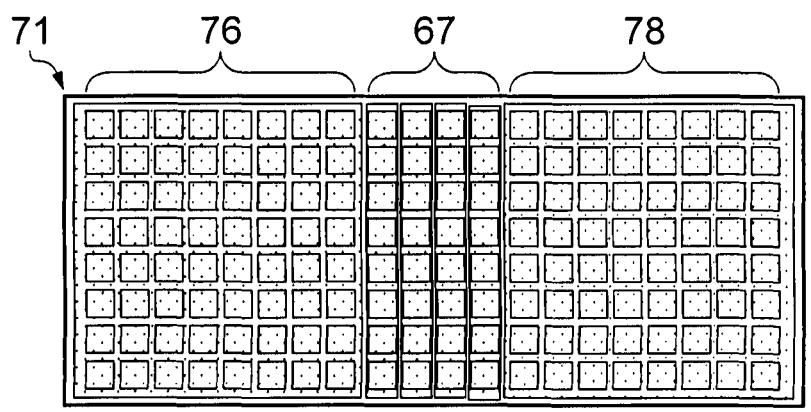

FIGS. 8A to 8D illustrate plan views of example apparatus 71. In FIGS. 8A and 8B the plan view is of an upper side of the apparatus 71. The apparatus 71 comprises a first portion 76, a second portion 78 and a bend region 67. The bend region may be provided between the first portion 76 and the second portion 78.

The first portion 76 and the second portion 78 are operable as a display and so comprise a plurality of pixels. Each of the pixels in the first portion 76 is coupled to each of the other pixels in the first portion 76. Similarly each of the pixels in the second portion 78 may be coupled to each of the other pixels in the second portion 78. In some example apparatus 71 the first portion 76 and/or the second portion 78 may be rigid. The first portion 76 and/or the second portion 78 may be rigid so that the respective pixels within the portion do not move relative to each other.

The bend region 67 may also be operable as a display and so also comprises a plurality of pixels. However as the bend region may be bent and/or folded the pixels within the bend region 67 may move relative to each other. To enable relative movement of the pixels a gap is provided between each of the pixels. The gap 122 may be provided so that the pixels are separate from each other. The gaps 122 create a plurality of discontinuities in the display layers 77. The plurality of discontinuities may increase the flexibility of the apparatus 71 within the bend region 67. This may enable a user to bend and/or fold the device more easily.

In FIG. 8A a plurality of individual pixels are provided. In FIG. 8A the pixels are individual in that they are physically separated from the other pixels in the bend region 67.

FIG. 8B illustrates a similar apparatus 71. However in the apparatus 71 of FIG. 8B the pixels in the bend region are provided in a plurality of rows rather than as individual pixels. In the example of FIG. 8B each of the pixels in the row is coupled to the other pixels in the row so that pixels within the same row are restricted from moving relative to each other. However the pixels in different rows are not coupled to each other which may allow the respective rows of pixels to move relative to each other.

Figure 8C:
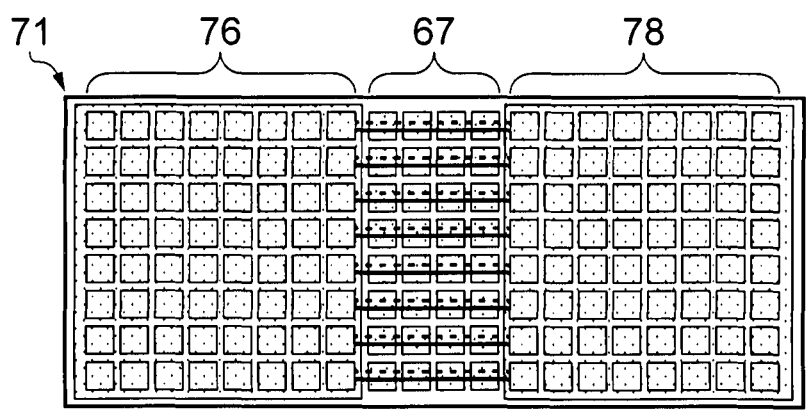
Figure 8D:
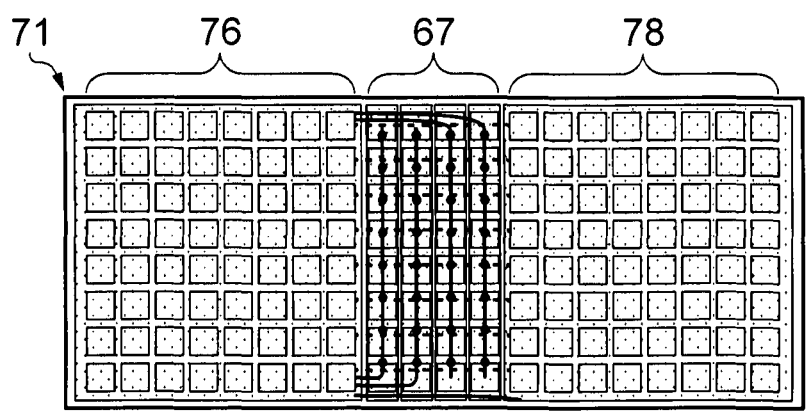

FIGS. 8C and 8D illustrate the underside of the apparatus and show the electrical connections. FIG. 8C represents the electrical connections in an example where a plurality of individual pixels are provided. FIG. 8D represents the electrical connections in an example where a plurality of rows of pixels are provided. In FIG. 8C an anode and cathode connection is provided for each of the individual pixels. In FIG. 8D an anode connection is provided for each pixel. A cathode connection is provided for each of the rows of pixels and a gate connection is provided to each of the pixels within the rows.

FIGS. 9A and 9B illustrate an example electronic device 10 which may comprise an apparatus 71 as described above with reference to FIGS. 7 and 8A to 8D. The electronic device 10 may be configured for communication such as wireless communication.

The apparatus 71 may comprise a first portion 76 and a second portion 78. The first and second portion 76, 78 may be rigid. The first and second portion 76, 78 are connected via a bend region 67. The bend region 67 may be hinged and/or flexible. The bend region 67 may be configured to enable the apparatus 71 to be moved between an open and closed configuration.

In FIG. 9A the electronic device 10 is configured in an open configuration. In the example open configuration the electronic device 10 is opened flat or substantially flat. In the example open configuration the user interface device 61 may be accessible to a user. The plurality of individual pixels 161 in the apparatus 71 may be configured to enable information to be displayed in the bend region 67. The apparatus 71 may also be configured to detect user inputs made within the bend region 67.

In FIG. 9B the electronic device 10 is configured in a closed configuration. In the closed configuration of FIG. 9B the first portion 76 of the apparatus 71 and the second portion 78 of the apparatus 71 are provided overlaying and facing each other. In the configuration of FIG. 9B the user interface device 61 is not accessible to the user when the electronic device 10 is in the closed configuration.

When the electronic device 10 is arranged in the closed configuration the individual pixels or groups of pixels move relative to each other to enable the apparatus 71 to bend. It can be seen in FIG. 9B that the separation between the cathodes 91 of the individual pixels or groups of pixels increases relative to the separation between the anodes 83. The connections 160 between the cathodes 91 may need to be flexible or extendable to allow for this relative movement.

FIGS. 10A and 10B illustrate another example electronic device 10 which may comprise an apparatus 71 as described above with reference to FIGS. 7 and 8A to 8D. The electronic device 10 may be configured for communication such as wireless communication.

In FIGS. 10A and 10B the individual pixels 161 or groups of pixels are arranged to have a trapezoid cross section. FIG. 10C illustrates a cross section of one of the pixels or rows of pixels in more detail. The upper layer of the pixels which is adjacent to the flexible layer 111 is wider than the lower surface. This creates triangular gaps 122 between the individual pixels when the apparatus is in the open configuration.

The shape of the pixels also enables the electronic device to be arranged into a folded configuration in which the user interface device 61 is provided on the outer surface of the electronic device 10 as illustrated in FIG. 10B. When the apparatus is folded into this configuration the size of the gaps 122 between the respective pixels decreases The shape of the pixels provided in the example of FIGS. 10A and 10B may enable the apparatus to be arranged in either a folded configuration where the user interface device 61 is not accessible or a folded configuration where the user interface device 61 is accessible. This may increase the functionality of an electronic device 10.

The term 'comprise' is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this detailed description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
a first plurality of layers and a second plurality of layers, the first plurality of layers and the second plurality of layers laterally arranged and comprising a first subset of layers configured to provide a display;
a plurality of electrical connections connecting the first plurality of layers and the second plurality of layers;
at least one controller electrically coupled to the plurality of electrical connections, the at least one controller being configured to control the first plurality of layers and the second plurality of layers; and
a flexible layer overlaying the laterally arranged first plurality of layers and second plurality of layers;
wherein the flexible layer is continuous across a bend region and the first plurality of layers and the second plurality of layers are coupled to the same surface of the flexible layer and comprise a plurality of gaps across the bend region; and
wherein the first plurality of layers and the second plurality of layers are configured such that the display is operable to detect user inputs in the bend region.

2. An apparatus as claimed in claim 1 wherein the display comprises a touch sensitive portion.

3. An apparatus as claimed in claim 1 wherein the first plurality of layers and the second plurality of layers are configured so that the display is operable across the bend region.

4. The apparatus of claim 2, wherein the touch sensitive portion comprises a touch pattern layer configured to detect the user inputs in the bend region.

5. An apparatus as claimed in claim 1 wherein the first plurality of layers and the second plurality of layers comprise a second subset of layers configured to provide a touch sensitive portion.

6. An apparatus as claimed in claim 1 where the first plurality of layers and the second plurality of layers are configured so that the gap defines a discontinuity in the bend region.

7. An apparatus as claimed in claim 1 wherein the first plurality of layers and the second plurality of layers are arranged so as to provide a plurality of pixels in the bend region where the plurality of pixels are provided in an arrangement which enables bending of the bend region.

8. An apparatus as claimed in claim 1 wherein the first plurality of layers and the second plurality of layers are arranged so as to provide a plurality of separate individual pixels in the bend region.

9. An apparatus as claimed in claim 1 wherein the first plurality of layers and the second plurality of layer are arranged so as to provide a plurality of separate rows of pixels in the bend region.

10. An apparatus as claimed in claim 7 wherein the cross-sectional shape of the pixels is configured to facilitate bending of the bend region.

11. An apparatus as claimed in claim 1 wherein the bend region comprises a hinge.

12. An apparatus as claimed in claim 1 wherein the bend region comprises a living hinge.

13. An electronic device comprising an apparatus as claimed in claim 1.

14. An electronic device as claimed in claim 13 wherein the electronic device comprises a flexible portion.

15. The apparatus of claim 1, wherein the plurality of electrical connections extending across the plurality of gaps and connecting the first plurality of layers and the second plurality of layers connect individual pixels of the first plurality of layers and the second plurality of layers.

16. An apparatus comprising:
a first plurality of layers and a second plurality of layers, the first plurality of layers and the second plurality of layers laterally arranged and comprising a first subset of layers configured to provide a display;
a plurality of electrical connections connecting the first plurality of layers and the second plurality of layers;

at least one controller electrically coupled to the plurality of electrical connections, the at least one controller being configured to control the first plurality of layers and the second plurality of layers; and a flexible layer overlaying the laterally arranged first plurality of layers and second plurality of layers, the first plurality of layers and the second plurality of layers being coupled to the same surface of the flexible layer and comprising a plurality of gaps, the flexible layer being configured to allow the first plurality of layers to bend relative to the second plurality of layers at the gap;

wherein the first plurality of layers and the second plurality of layers are configured such that the display is operable to detect user inputs in the bend region.

* * * * *